United States Patent
Stenzel et al.

(10) Patent No.: US 9,188,687 B2
(45) Date of Patent: Nov. 17, 2015

(54) PRESSURE ACTIVATED LINEAR LOCKING MECHANISMS AND RELATED METHODS

(71) Applicant: PGS Geophysical AS, Oslo (NO)

(72) Inventors: Andre Stenzel, Sugar Land, TX (US); Bengt Finnoen, Katy, TX (US); Youlin Hu, The Woodlands, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/243,940

(22) Filed: Apr. 3, 2014

(65) Prior Publication Data

US 2015/0133012 A1    May 14, 2015

Related U.S. Application Data

(60) Provisional application No. 61/903,623, filed on Nov. 13, 2013.

(51) Int. Cl.
*G01V 1/20* (2006.01)
*G01V 1/38* (2006.01)

(52) U.S. Cl.
CPC *G01V 1/201* (2013.01); *G01V 1/38* (2013.01); *G01V 2001/207* (2013.01)

(58) Field of Classification Search
CPC ........... G01V 1/20; G01V 1/201; G01V 1/38; G01V 2001/207; B63G 8/14; F16L 1/12
USPC ................ 114/245; 441/133; 405/171; 222/5
See application file for complete search history.

(56) References Cited

U.S. PATENT DOCUMENTS

| | | | |
|---|---|---|---|
| 2,761,927 | A | 9/1956 | Szypulski |
| 3,909,774 | A | 9/1975 | Pavey, Jr. |
| 4,823,325 | A | 4/1989 | Cole, Jr. |
| 4,928,262 | A | 5/1990 | Neeley et al. |
| 5,076,468 | A | 12/1991 | Mackal |
| 5,400,922 | A | 3/1995 | Weinheimer et al. |
| 5,404,339 | A | 4/1995 | Cole, Jr. |
| 5,509,576 | A | 4/1996 | Weinheimer et al. |

(Continued)

OTHER PUBLICATIONS

Bal Seal Engineering, Inc. (n.d.). Retrieved from http://www.balseal.com/home.

(Continued)

*Primary Examiner* — Lars A Olson

(57) ABSTRACT

Pressure activated linear locking mechanisms and related methods. At least some of the illustrative embodiments are systems including: a first and second cover defining an inner and outer surface, a length, and a locking portion, respectively; a first and second hollow defined in the locking portion of the first and second cover member, respectively, the hollows extending along the length of the first and second cover members, respectively; a locking member defining first and second appendages extending along a first and second side, respectively, each appendage defines a cross-section and an internal volume; said first and second appendages disposed within the first and second hollows, respectively, and when the releasable cover is exposed to atmospheric pressure, the first and second appendages in an inflated condition; and the first and second appendages are configured to transition to a deflated condition in response to a predetermined pressure greater than the initial pressure.

35 Claims, 11 Drawing Sheets

(56) References Cited

U.S. PATENT DOCUMENTS

| | | |
|---|---|---|
| 6,019,652 A | 2/2000 | Nielsen et al. |
| 6,533,627 B1 | 3/2003 | Ambs |
| 6,612,886 B2 | 9/2003 | Cole, Jr. |
| 7,475,711 B2 | 1/2009 | Fawcett, Jr. et al. |
| 8,469,634 B2 | 6/2013 | Stenzel et al. |
| 2011/0049449 A1 | 3/2011 | Scott |
| 2013/0028046 A1 | 1/2013 | Stenzel et al. |
| 2013/0028662 A1 | 1/2013 | Stenzel et al. |
| 2013/0028663 A1 | 1/2013 | Stenzel et al. |

OTHER PUBLICATIONS

McMaster-Carr (n.d.) Retrieved from http://www.mcmaster.com/ (Apr. 3, 2012).

Fike Corporation (n.d.) Bursting discs and rupture disk protection from Fike. Retrieved from http://www.fike.com/products/rupturediscs.asp (Apr. 3, 2012).

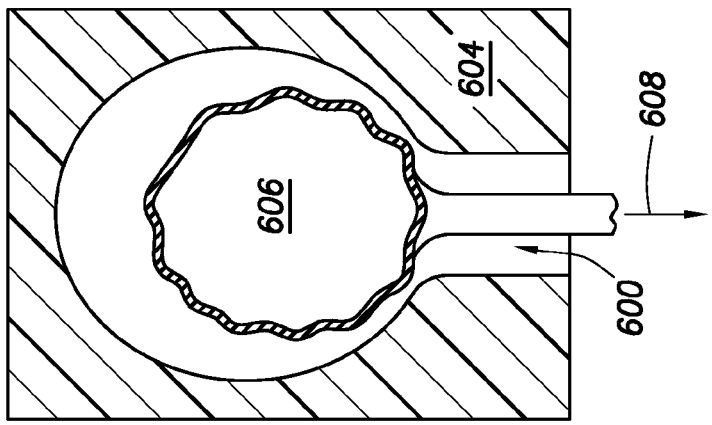
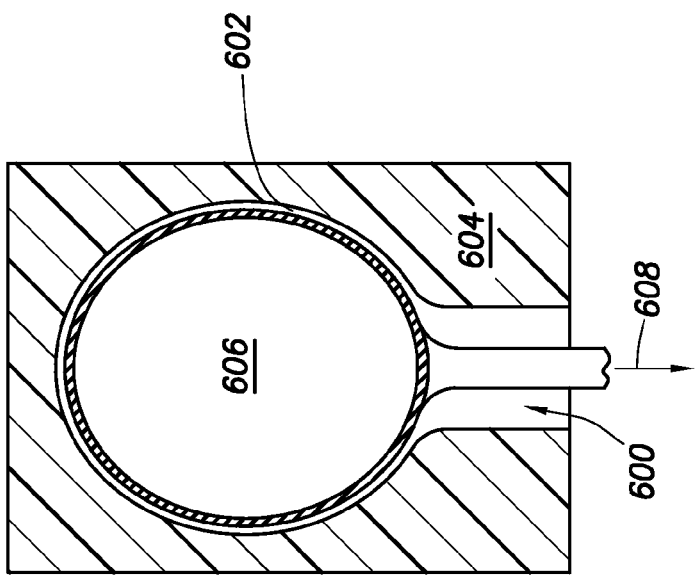

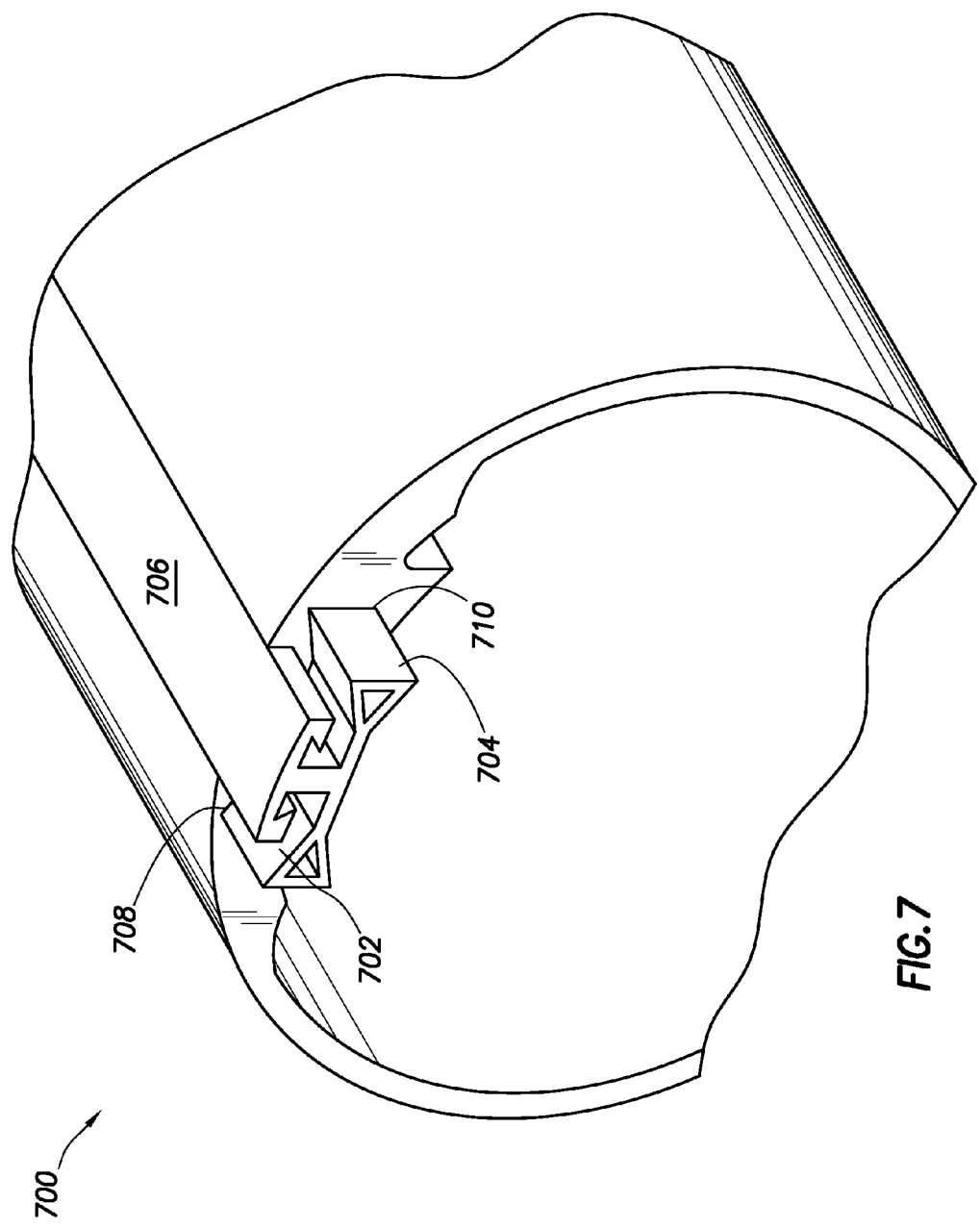

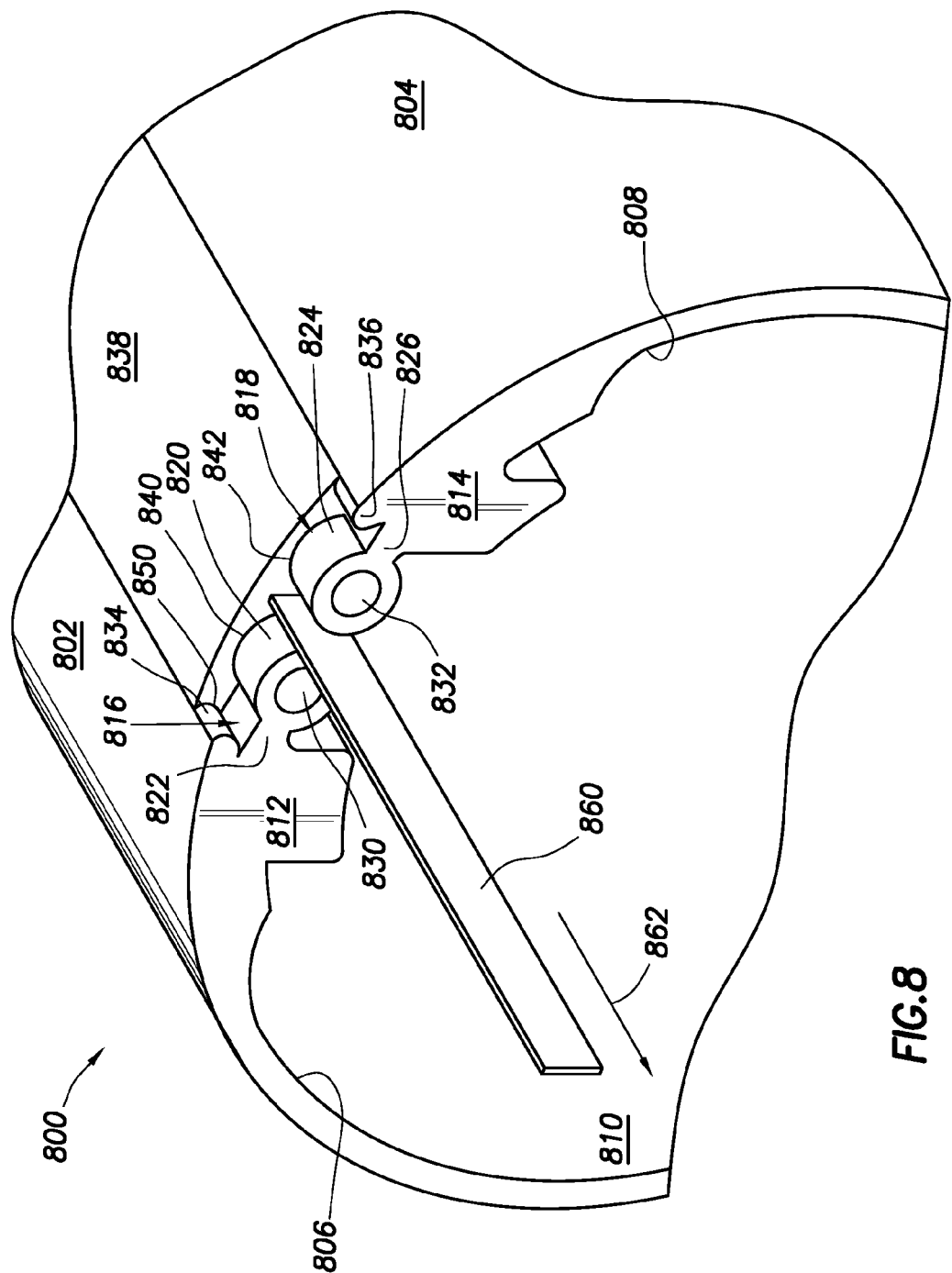

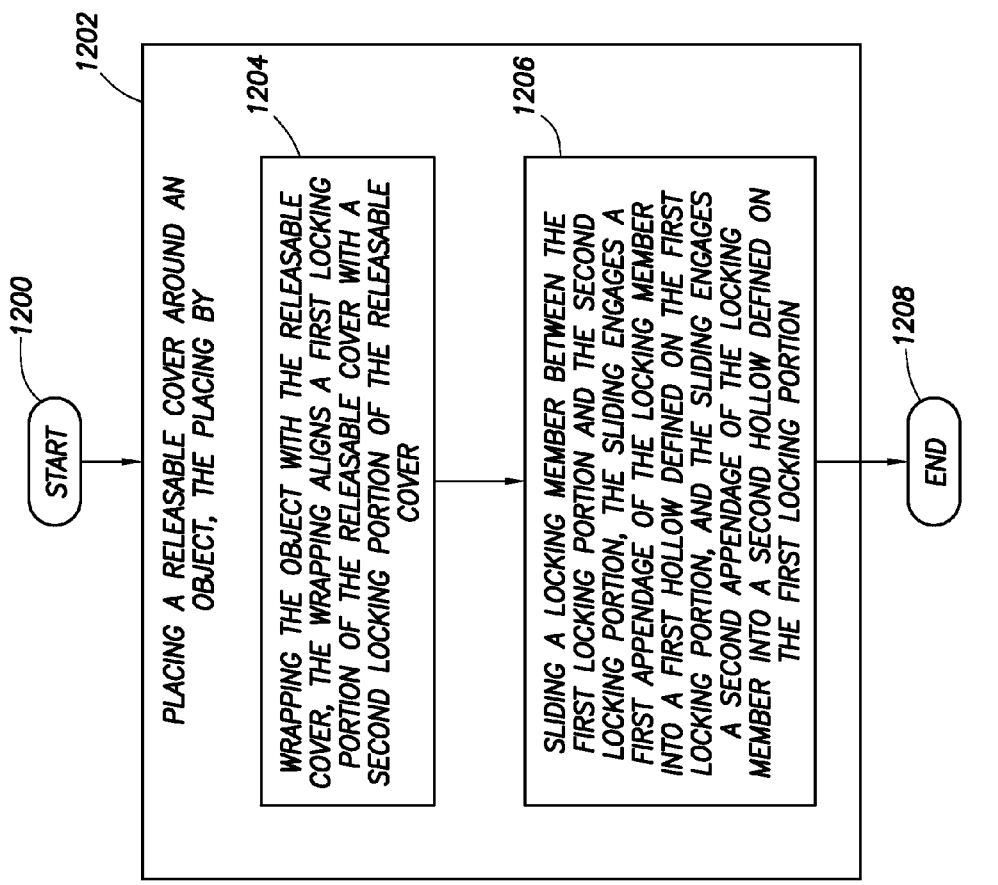
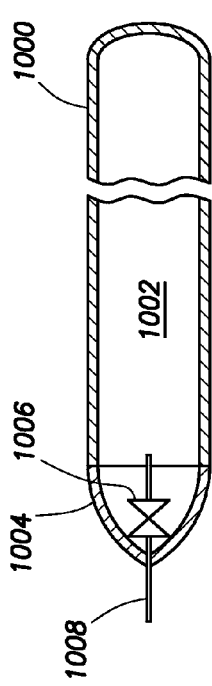
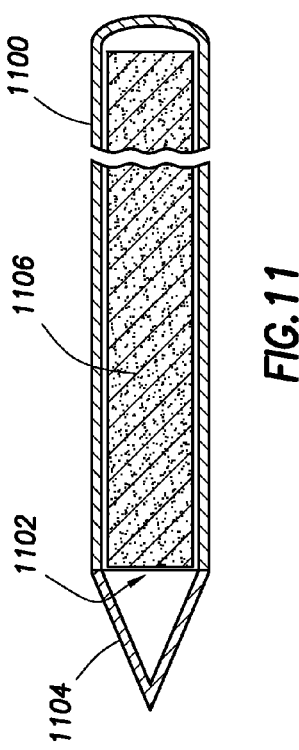

US 9,188,687 B2

PRESSURE ACTIVATED LINEAR LOCKING MECHANISMS AND RELATED METHODS

CROSS-REFERENCE TO RELATED APPLICATIONS

This application claims priority to U.S. Provisional Application Ser. No. 61/903,623, filed Nov. 13, 2013, tilted "Pressure Activated Linear Locking Mechanism and Related Methods," the disclosure of which is incorporated herein by reference as if reproduced in full below.

BACKGROUND

Marine geophysical survey systems are used to acquire data (e.g., seismic, electromagnetic) regarding Earth formations below a body of water such as a lake or ocean. The marine geophysical survey systems may use a plurality of sensor streamers which contain one or more sensors disposed proximate an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable lifting bag system may trigger (i.e., a retriever system). During initial inflation each lifting bag dislodges a respective protective cover, and as the lifting bags continue to inflate the bag systems causes the sensor streamer to surface.

BRIEF DESCRIPTION OF THE DRAWINGS

For a detailed description of exemplary embodiments, reference will now be made to the accompanying drawings in which:

FIG. 6A shows an elevation view of an appendage disposed within a hollow in accordance with at least some embodiments;

FIG. 6B shows an elevation view of an appendage disposed within a hollow in accordance with at least some embodiments;

FIG. 7 shows a perspective, cross-sectional view of a portion of an releasable cover held together with a locking member, in accordance with at least some embodiments;

FIG. 8 shows a perspective, cross-sectional view of a portion of an releasable cover held together with a locking member, in accordance with at least some embodiments;

FIG. 10 shows a schematic, partial cross-sectional diagram of a system in accordance with at least some embodiments;

FIG. 11 shows a cross-sectional view of an appendage in accordance with at least some embodiments;

FIG. 12 shows, in block diagram form, a method in accordance with at least some embodiments.

NOTATION AND NOMENCLATURE

Figure 1:
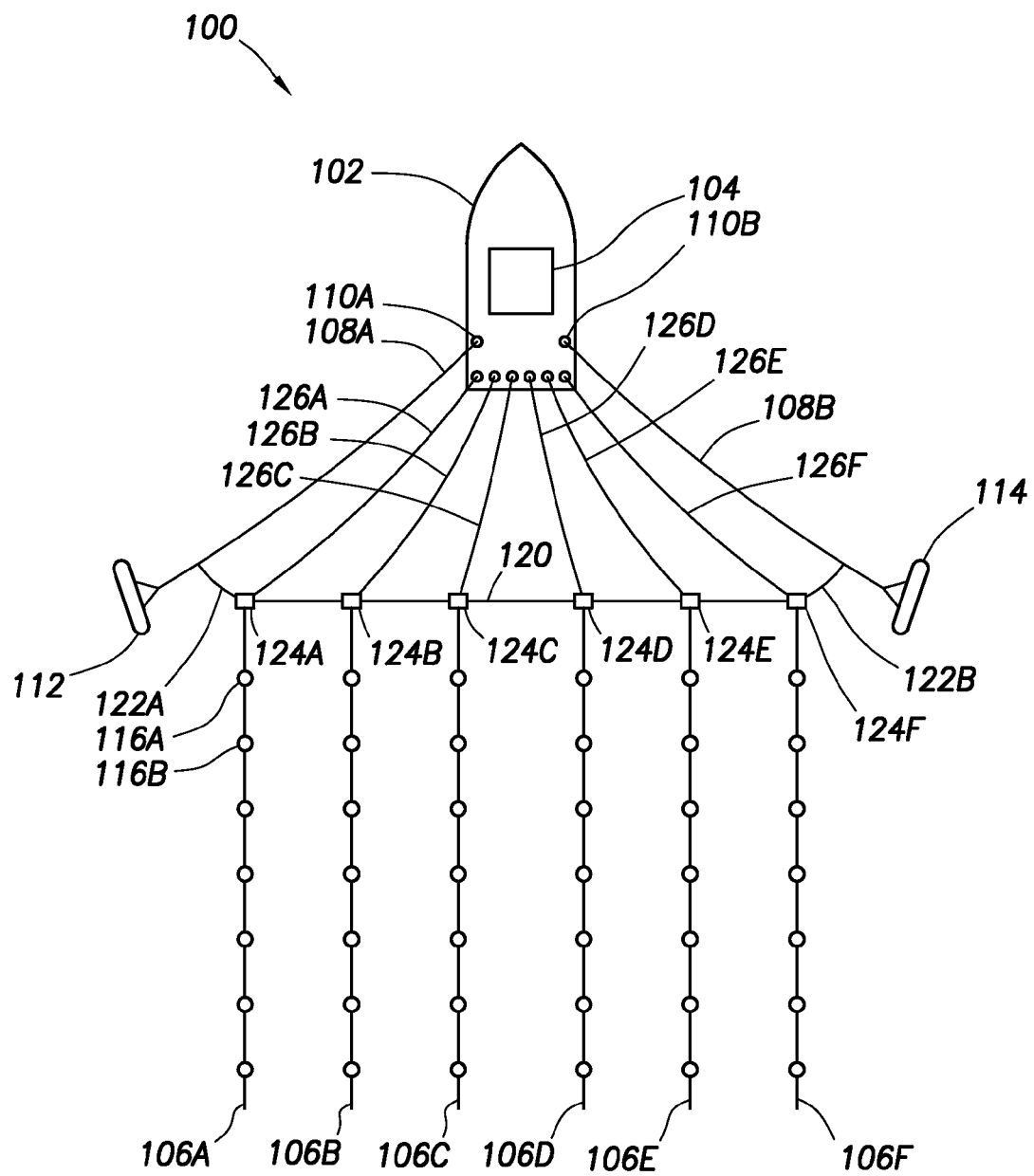
FIG. 1 shows an overhead view of marine geophysical survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus five percent (5%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

"Sealed internal volume" shall mean an internal volume sealed against escape of a gas from the internal volume. The presence of a valve as a mechanism to fill the internal volume, or to selectively change pressure within the internal volume, shall not negate the status of an internal volume as a sealed internal volume.

"Inflated condition" shall mean an expanded state of structure having an internal volume (e.g., a sealed internal volume, a non-sealed internal volume), and the inflated condition is independent of the pressure within the internal volume.

"Deflated condition" shall mean, in relation to an inflated condition, a flattened or deformed state of structure having an internal volume (e.g., a sealed internal volume, a non-sealed internal volume), and the deflated condition is independent of the pressure within the internal volume.

"Non-triggered", with respect to a retriever system or components thereof, shall mean that the depth trigger mechanism is armed and has yet to change operational state from the armed condition.

"Triggered", with respect to a retriever system or components thereof, shall mean that the depth trigger mechanism has changed operational state responsive to reaching or exceeding a predetermined depth.

"Central axis" regarding a sensor streamer shall mean an axis of the sensor streamer parallel to the length of the sensor streamer.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to releasable covers. More particularly, at least some embodiments are directed to covers for objects where the cover releases from itself (and thus releases from the formerly covered object) as a function of ambient pressure. The various embodiments were developed in the context of releasable covers for retriever systems for marine geophysical survey equipment where the cover releases in an example range of 50 to 80 meters (m) (i.e., the cover releases in a pressure range of 735 pounds per square inch (psi) to 1176 psi). The description that follows is based on the developmental context. However, the developmental context of releasable covers for retriever systems for marine geophysical survey equipment shall not be read as a limitation of the various example structures and methods to just retriever systems. The releasable covers may be used in association with any device where a cover may need to release as a function of ambient pressure (e.g., submerged depth), and thus the depth and pressure range above is merely an example. The specification first turns to an illustrative marine geophysical survey system to orient the reader, and then to example embodiments.

FIG. 1 shows an overhead view of a marine geophysical survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six sensor streamers 106, any number of sensor streamers 106 may be used. The discussion continues with respect to sensor streamers 106 being sensor streamers, but sensor streamers 106 are illustrative of any towed geophysical survey cable, such as transmitter cables and source cables. Likewise, sensor streamers 106 may contain a variety of different sensors, including pressure sensors, particle velocity sensors, geophones, hydrophones, accelerometers, electrodes, magnetic field detectors, gravimeters, positioning sensors, compasses, etc.

In the illustrated embodiment, the sensor streamers 106 may be coupled to towing equipment that may help to maintain the sensor streamers 106 at selected depth and lateral positions with respect to each other and with respect to the survey vessel 102. The towing equipment may comprise two paravane tow lines 108A and 108B each coupled to the survey vessel 102 by way of winches 110A and 110B, respectively. The winches may enable changing the deployed length of each paravane tow line 108. The second end of paravane tow line 108A may be coupled to a paravane 112, and the second end of paravane tow line 108B may be coupled to paravane 114. In each case, the tow lines 108A and 108B may couple to their respective paravanes through respective sets of lines called a "bridle". The paravanes 112 and 114 may be each configured to provide a lateral force component to the various elements of the marine geophysical survey system 100 when the paravanes are towed in the water. The combined lateral forces of the paravanes 112 and 114 may separate the paravanes from each other until the paravanes put one or more spreader lines 120, coupled between the paravanes 112 and 114, into tension. The paravanes 112 and 114 may either couple directly to the spreader line 120 or, as illustrated, couple to the spreader line by way of spur lines 122A and 122B.

As illustrated, the sensor streamers 106 may be each coupled, at the ends nearest the survey vessel 102 (i.e., the proximal ends), to a respective lead-in cable terminations 124A-F. The lead-in cable terminations 124 may be coupled to, or are associated with, the spreader lines 120 so as to help to control the lateral positions of the sensor streamers 106 with respect to each other and with respect to the survey vessel 102. Electrical and/or optical connections between the appropriate components in the onboard equipment 104 and the sensors (e.g., 116A, 116B) in the sensor streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed. As would be understood by one of ordinary skill in the art with the benefit of this disclosure, the illustrated towing equipment may be used alone or in conjunction with other lateral position and depth control equipment. Other embodiments may have more complex or simpler towing arrangements.

Figure 2:
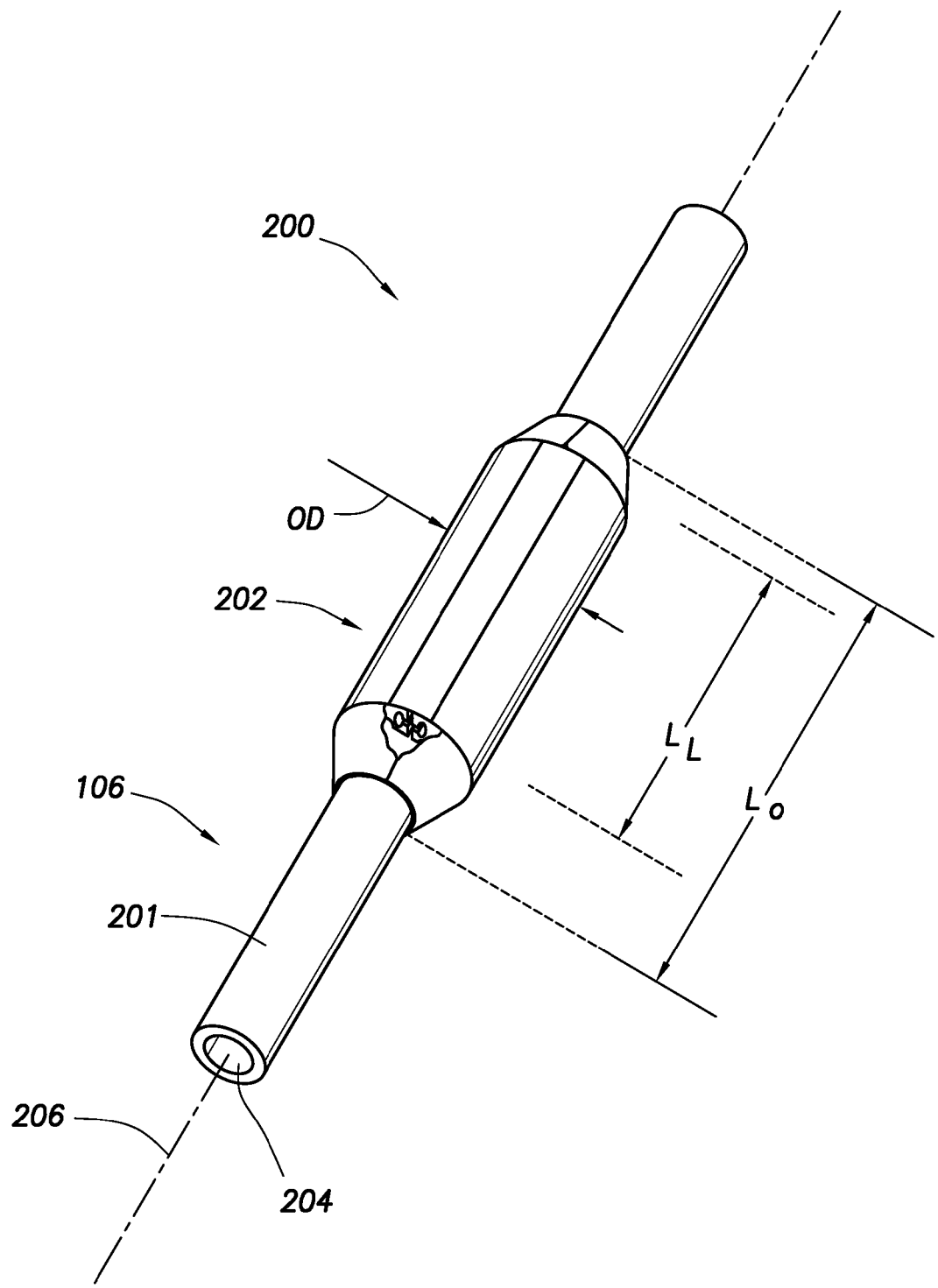
FIG. 2 shows a perspective view of a retriever system in accordance with at least some embodiments.

FIG. 2 shows a perspective, partial cut-away, view of a retriever system 200 in a non-triggered state in accordance with at least some embodiments. The retriever system 200 comprises a releasable cover 202 (hereafter just "cover 202") that defines an outside diameter (OD), an overall length ($L_O$), as well as a locking length ($L_L$). In some cases the overall length $L_O$ is the same as locking length $L_L$. In other cases, the locking length $L_L$ may include not only a length spanning the largest outside diameter OD, but also at least some of the tapered ends, depending on the thickness of the tapered ends. Thus, the overall length $L_O$ includes locking length $L_L$ and any remaining portion the tapered ends. The cover 202 is discussed more thoroughly below, and may be particularly useful in situations where the operator would like to spool the sensor streamer 106 onto a reel without removing the cover. Thus, the cover may be flexible enough to properly spool. FIG. 2 further shows a portion of a sensor streamer 106 that comprises an elongated outer jacket 201 defining an interior volume 204. The elongated outer jacket 201 defines a central axis 206 along the long dimension of sensor streamer 106. Though not specifically shown in FIG. 2, various sensors (e.g., hydrophones, geophones, electromagnetic sensors) associated with the sensor streamer 106 may reside within interior volume 204 or on elongated outer jacket 201 and may be spaced longitudinally along the sensor streamer 106. Likewise, and also not specifically shown, one or more ropes may reside within the sensor streamer 106 (the ropes known as strength members), and may carry the towing force of the sensor streamer 106.

While FIG. 2 only shows one retriever system 200, it will be understood that a sensor streamer may have a length on the order of about 5000 to 15000 meters, and thus a plurality of such retriever systems 200 may be spaced along, and thus associated with, each sensor streamer 106. In some cases, the retriever systems associated with a sensor streamer may be evenly spaced along the elongated outer jacket 201, but such even spacing is not strictly required. In some embodiments, a retriever system 200 such as shown in FIG. 2 may be placed about every 300 meters along a sensor streamer, but closer and farther spacing is also contemplated.

Figure 3:
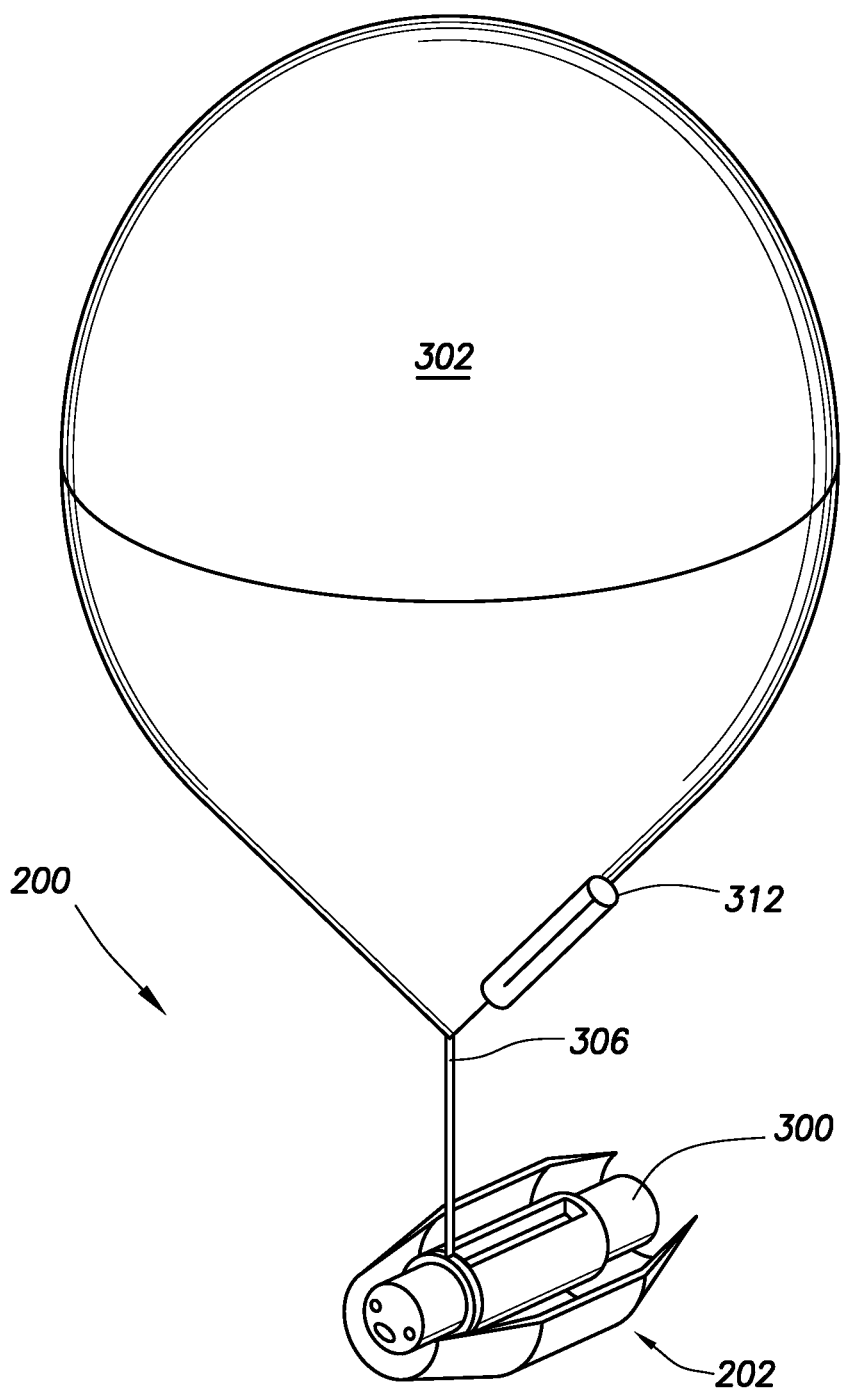
FIG. 3 shows an exploded perspective view of a retriever system in accordance with at least some embodiments.

FIG. 3 shows a perspective view of an illustrative retriever system 200 in a triggered condition. In particular, FIG. 3 shows lifting bag 302 in an inflated state in the example form of a balloon. In one embodiment, the illustrative lifting bag 302 couples to an attachment block 300 by way of a rope or tether 306. The attachment block 300 is coupled to the elongated outer jacket 201 (FIG. 2) of the sensor streamer. In another embodiment, the attachment block 300 may be omitted, and the components of the retriever system 200 may be coupled over the elongated outer jacket 201 (FIG. 2) of the sensor streamer 106.

In the triggered or deployed condition, the cover 202 of the retriever system 200 opens or releases to enable the lifting bag 302 to inflate, for example by way of a gas contained in a gas cylinder contained with a sleeve 312. In the example system of FIG. 3, the cover 202 comprises a single "U" shaped structure when not connected over the underlying components. In other embodiments, the cover 202 may comprise more than one component (e.g., two halves).

Figure 4:
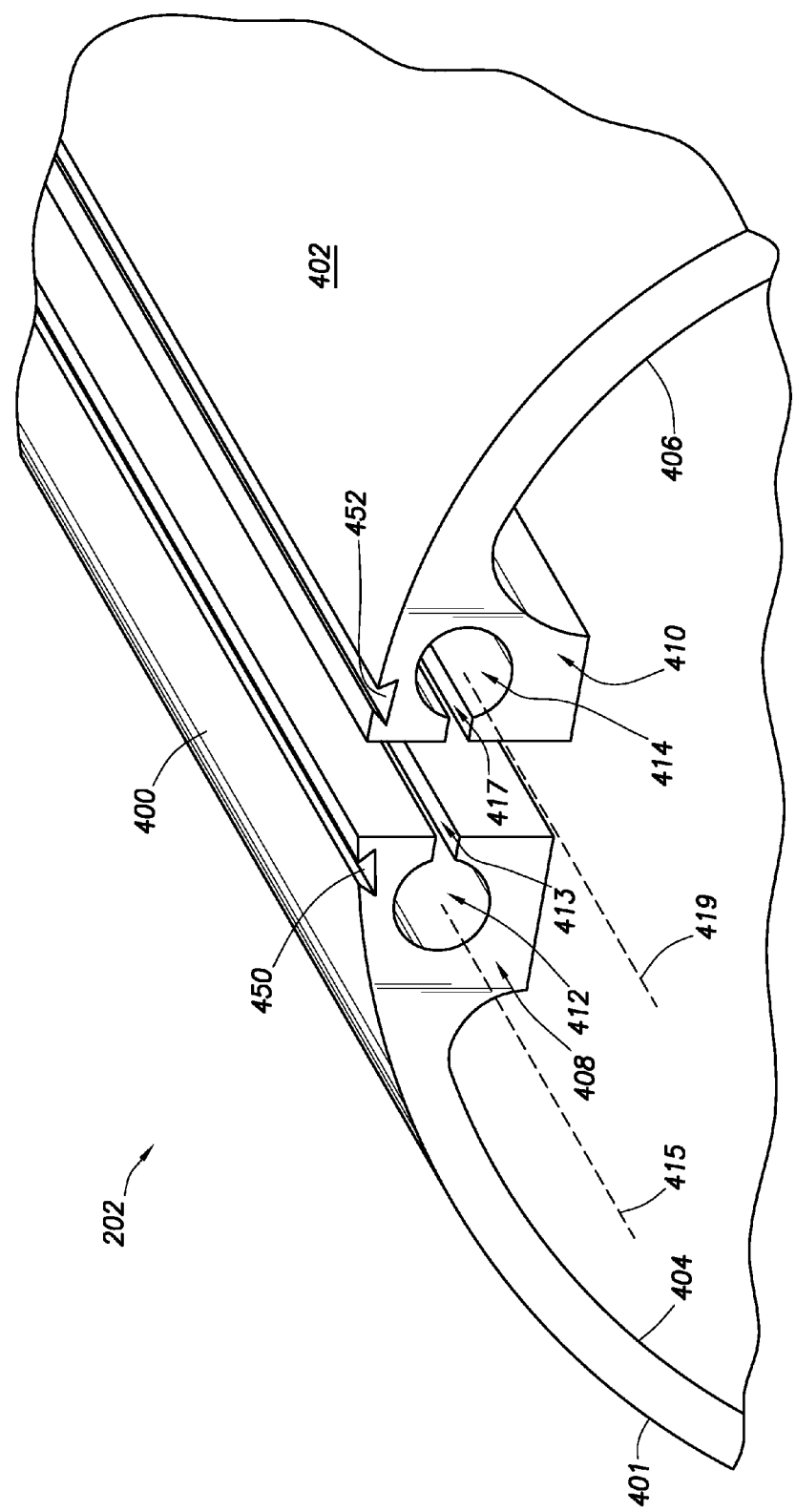
FIG. 4 shows a perspective, cross-sectional view of a portion of an releasable cover without a locking member, in accordance with at least some embodiments.

FIG. 4 shows a perspective, cut-away view of a portion of a cover 202 without a locking member in accordance with at least some embodiments. In particular, FIG. 4 shows example cover 202 comprising a first cover member 400 and a second cover member 402. The first cover member 400 defines an internal or inner surface 404, and likewise the second cover member 402 defines an internal or inner surface 406. In example systems, the cover members 400 and 402 may be opposites ends of a single "U" shaped structure, and the portion of the cover 202 between the first and second cover members 400 and 402 may be referred to as spanning cover member 401 (the entire spanning cover member 401 not shown so as to show the locking portions in better detail). In accordance with example embodiments the cover 202 may be made of polyurethane with a durometer reading of 85 A, but other materials (e.g., nylon), and other durometer readings, may be used.

The cover members 400 and 402 define locking portions 408 and 410, respectively. As will be discussed more below, the locking portions define various features which create a releasable coupling between the first cover member 400 and the second cover member 402.

In the example system of FIG. 4, the first cover member 400, and in particular the locking portion 408, defines a trough or hollow 412 that extends along locking length $L_L$ of the cover 202. In the example system shown, the hollow 412 has a circular cross-sectional shape connected to a slot 413, and thus could be considered to define the cross-sectional shape of a "keyhole." However, as discussed below, other cross-sectional shapes are also contemplated. The hollow 412 defines a central axis 415 such that, when the cover 202 is installed, the central axis 415 of the hollow 412 is parallel to central axis 206 (FIG. 2) of the sensor streamer 106. Similarly, the second cover member 402, and in particular the locking portion 410, defines a hollow 414 connected to a slot 417, and thus could also be considered to define the cross-sectional shape of a "keyhole." The hollow 414 in the example system has a circular cross-sectional shape, but as discussed below other cross-sectional shapes are also contemplated. Moreover, the cross-sectional shapes as between hollow 412 and hollow 414 need not be the same. The hollow 414 defines a central axis 419 such that, when the cover 202 is installed, the central axis 419 of the hollow 414 is parallel to central axis 206 (FIG. 2) of the sensor streamer 106, and likewise parallel to the central axis 415 of hollow 412.

In the example system of FIG. 4, locking portion 408 further defines a trough 450 on an outer surface of the cover 202, and the trough 450 runs parallel to hollow 412. Similarly, locking portion 410 defines a trough 452 on an outer surface of the cover 202, and the trough 452 runs parallel to hollow 414. The troughs 450 and 452 are shown to have triangular cross-sections; however, other cross-sectional shapes may be used, and the troughs 450 and 452 need not have the same cross-sectional shape. In order to describe how the cover 202 is coupled around an underlying structure (e.g., a retriever system), reference is made to FIG. 5.

Figure 5:
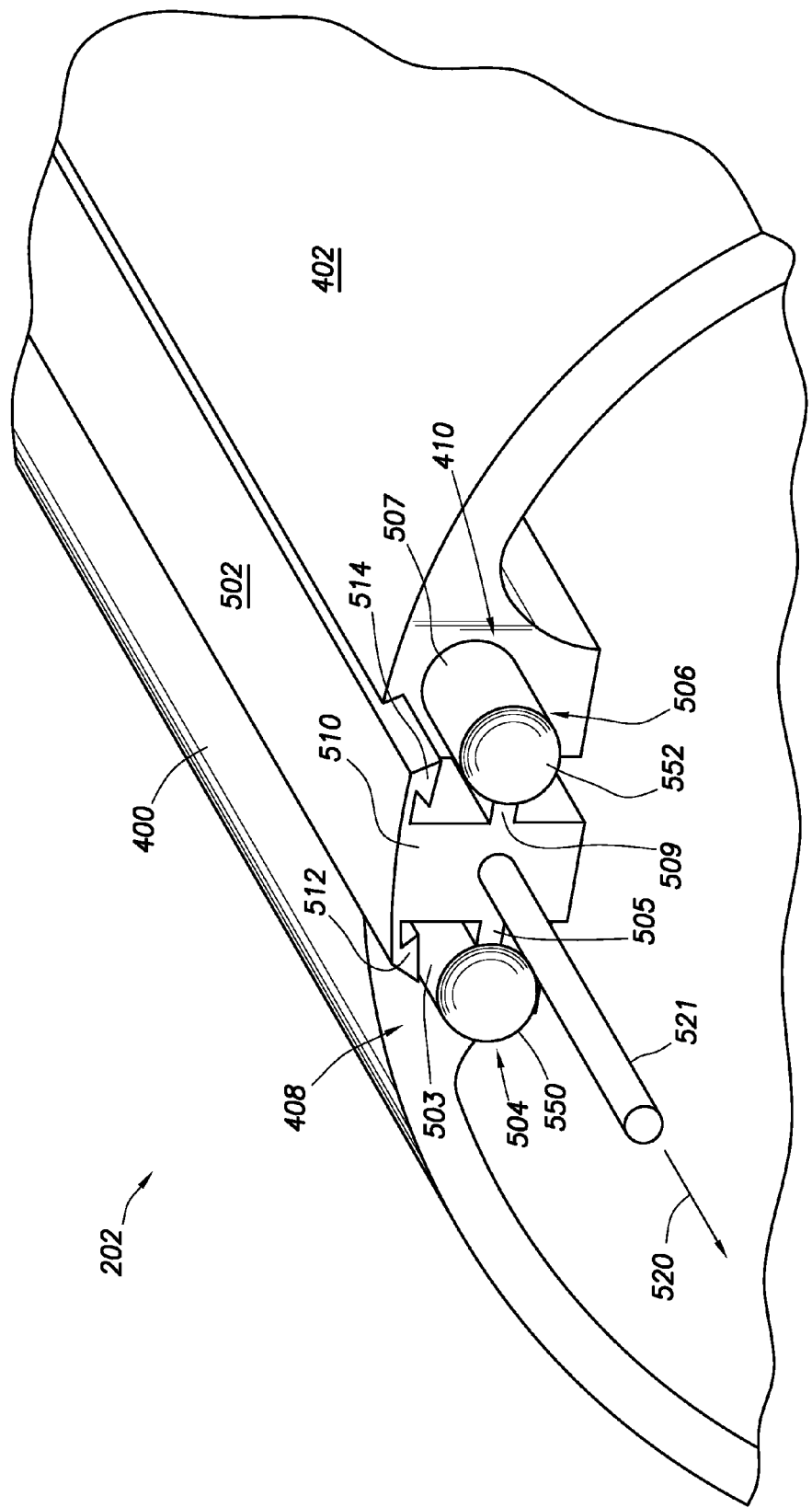
FIG. 5 shows a perspective, cross-sectional view of a portion of an releasable cover held together with a locking member, in accordance with at least some embodiments.

FIG. 5 shows a perspective, partial cut-away view of a portion of cover 202 in accordance with at least some embodiments. In particular, FIG. 5 shows the cover members 400 and 402 each coupled to a locking member 502 disposed between the locking portions 408 and 410. More particularly, the locking member 502 couples to the cover members 400 and 402, and in some cases defines a length at least as long the locking length $L_L$ (FIG. 2). The locking member 502 selectively holds the cover members 400 and 402 together, and thus holds the cover 202 in place over an underlying structure (e.g., a sensor streamer or other portions of a retriever system). In example systems, the locking member 502 is made of polyurethane with a durometer reading of 85 A, but other materials (e.g., nylon), and other durometer readings may be equivalently used.

The example locking member 502 of FIG. 5 defines a first appendage 504 on a first side of the locking member 502, where the appendage 504 extends along the length of the locking member 502, and also defines a second appendage 506 (disposed opposite the first appendage 504) that extends along the length of the locking member 502. In the example system of FIG. 5, the first appendage 504 defines a cylindrical member 503 held by a standoff portion 505. Each of the cylindrical member 503 and standoff portion 505 run the length of the locking member 502. Similarly, the second appendage 506 defines a cylindrical member 507 held by a standoff portion 509. Each of the cylindrical member 507 and standoff portion 509 run the length of the locking member 502.

The first appendage 504 defines an exterior cross-sectional shape that is the "negative" of, or complement of, the cross-sectional shape of the first hollow 412 and slot 413 (FIG. 4), and in the example system the cross-sectional shape is a "key" shape. In other words, the cylindrical member 503 of the first appendage 504 defines a circular cross-section which complements the circular cross-section of the first hollow 412, and the standoff portion 505 complements the slot 413. Similarly, the cylindrical member 507 of the second appendage 506 defines a circular exterior cross-sectional shape that is the "negative" of, or complement of, the circular cross-sectional shape of the first hollow 414, and the standoff portion 509 complements the slot 417.

When the locking member 502 is holding the cover members 400 and 402 together, and as shown in FIG. 5, the cylindrical member 503 of the first appendage 504 is disposed within the first hollow 412 (and the standoff is disposed in the slot 413 (not visible in FIG. 5)), and the cylindrical member 507 of the second appendage 506 is disposed within the second hollow 414 (and the standoff 509 is in the slot 417 (not visible in FIG. 5)).

The example locking member 502 of FIG. 5 further comprises an optional "T" structure 510, so named because the cross-sectional shape is that of the capital letter "T". The "T" structure 510 comprises dovetail members 512 and 514 disposed on opposite ends of upper portion of the "T" structure 510, with the dovetail members 512 and 514 protruding in the same direction as the center portion of the "T" structure. In the example configuration shown in FIG. 5, dovetail members 512 and 514 mate with complementary troughs 450 and 452 (shown in FIG. 4), respectively, in the locking portions 408 and 410 of the cover members 400 and 402, respectively. In one embodiment, the "T" structure 510 may aid in holding the cover members 400 and 402 together at depths approaching a predetermined depth (e.g., 50 to 80 meters), but the "T" structure may not provide enough retaining force to hold the cover portions together once the predetermined depth is exceeded (discussed more below).

In example systems, each appendage 504 and 506 defines a sealed internal volume containing a compressible gas having a predetermined pressure. In the example case of FIG. 5, the internal volumes of the cylindrical members 503 and 507 are sealed on the visible ends by caps 550 and 552, respectively. The caps 550 and 552 are illustratively shown as conical structures with their apex ends protruding outwardly relative the sealed internal volumes. The opposite ends of the cylindrical members 503 and 507 (not visible in FIG. 5) may likewise be sealed with caps similar to caps 550 and 552. Other sealing structures and mechanisms may be used. In some cases, the gas within the sealed internal volumes is atmospheric air at atmospheric pressure, but other gases and pressures (both above and below atmospheric) may be used. Moreover, the material from which the appendages are constructed (again, in some cases polyurethane) has a certain compressibility. The compressibility of the appendages 504 and 506, along with the compressibility of the gas within the appendages, work together to form a releasable connection at the locking portion 408 and 410.

Consider, as an example, locking member 502 constructed such that, when the appendages 504 and 506 are sealed to form the respective sealed internal volumes, the pressure within each sealed internal volumes is approximately at atmospheric pressure (i.e., 14.7 pounds per square inch absolute (PSIA)). For purposes of this discussion, the appendages will be considered to be in an "inflated condition" when at sea level. Now consider that the locking member 502 is installed between cover members 400 and 402, and then the cover 202 is submerged in water. As the cover 202 descends to increasing depths within the water, the hydrostatic water pressure surrounding the appendages 504 and 506 increases. Since the appendages define sealed internal volumes, as the depth of the cover 202 increases, and thus the hydrostatic pressure increases, the appendages will tend to collapse. The collapse of the appendages occurs because the hydrostatic pressure overcomes the pressure within the sealed internal volumes, and the hydrostatic pressure overcomes the force of the material of the appendages tending to hold the appendages in their original, non-collapsed, shape. At a certain depth, hereafter the predetermined depth (as determined by the material of the appendages and the pressure within the sealed internal volumes), the appendages transition to a deflated condition such that the force tending hold the appendages 504 and 506 in their respective hollows 412 and 414 is substantially lost. Stated otherwise, as the external pressure on the outer surface of cover 202 increases, the appendages "deflate," though no loss of the gas inside the appendages takes place. When the external pressure exceeds a certain predetermined pressure (e.g., a pressure in the range of 735 to 1176 psi), the appendages transition to a deflated condition such that the force tending hold the appendages 504 and 506 in their respective hollows 412 and 414 is substantially lost. For example, the predetermined release pressure may be about twice atmospheric pressure.

Turning briefly to FIGS. 6A and 6B, FIG. 6A shows a cross-sectional elevation view of an example appendage in an inflated condition disposed within an example hollow. An example section of a locking portion 604 (which may conceptually correspond to locking portion 408 or 410) defines a hollow 602 (which may conceptually correspond to hollow 412 or 414). In FIG. 6, the hollow 602 has an example circular cross-sectional shape. In addition, FIG. 6 shows an example appendage 600 (which may conceptually correspond to appendage 504 or 506) with a sealed internal volume 606. The appendage 600 is shown disposed within the example hollow 602. The cross-sectional shape of hollow 602 is the negative of, or the complement of, the cross-sectional shape of the appendage 600. Thus, FIG. 6A is an example situation where the appendage is in an inflated condition, which tends to resist a force (shown by arrow 608) attempting to dislodge the appendage 600 from the hollow 602.

FIG. 6B, however, shows an example of the appendage 600 in a deflated condition. That is, FIG. 6B shows an example of the hydrostatic pressure surrounding the appendage causing the appendage to collapse or deform (and compress the gas within the sealed internal volume 606). The amount of force which tends to resist a force attempting to dislodge the appendage 600 (again shown by arrow 608) when the appendage 600 is in a deflated condition is significantly less, and thus other forces (e.g., spring force of the cover 202 itself, an expanding lifting bag 302) can more easily dislodge the appendage 600 from the hollow 602. Before proceeding, it is noted that FIG. 6B illustrates a deflated condition, but the "deflated condition" should not be read to require the appendage to flatten completely at the predetermined depth. The structural rigidity of the material making up the appendage, as well as the compressible gas within the sealed internal volume, will likely cause the appendage 600 to retain some form, though smaller or flatter than the form of the appendage at sea level.

Returning to FIG. 5, the locking member 502 may be installed by telescoping (i.e., sliding one into another, in the manner of the sliding tubes of a jointed telescope) the locking member 502 between the locking portions 408 and 410. More particularly, the locking member 502 may be placed at one end of the cover 202 and then telescoped or translated between the locking portions 408 and 410 such that the appendages 504 and 506 telescope within the respective hollows. In some cases, the locking member 502 may have a puller member 521 embedded at least partially within the locking member 502 and extending beyond the locking member so that an installer has a location at which to grasp and pull the locking member 502 into place, as shown by the arrow 520. The puller member 521 in the example system of FIG. 5 is shown as a solid cylindrical member (e.g., metallic material, high density plastic), but in other cases the puller member 521 may be a small diameter rope (e.g., nylon string). Moreover, during the installation of the locking member 502 between the locking portions 408 and 410, the dovetail members 512 and 514 may also telescope within their respective troughs 450 and 452.

As alluded to in reference to FIGS. 6A and 6B, as the appendages 504 and 506 collapse, the locking force provided by the locking member 502 coupled between locking portions 408 and 410 is diminished. At or below the predetermined depth (i.e., at or above a predetermined external pressure), sufficient latching force is lost such that the cover member 400 may separate from the cover member 402. In some cases, the cover members 400 and 402 are opposite ends of a single, integral "U" shaped structure such that, during installation, a spring force is created by torqueing the cover members 400 and 402 toward each other. Thus, when the spring force created by the cover members 400 and 402 overcomes the latching force created by the appendages 504 and 506 within the respective hollows 412 and 414, the cover members 400 and 402 may separate and the cover 202 may open.

In other cases, the latching force provided by the appendages 504 and 506 within the hollows may reduce as the cover 202 meets or exceeds a predetermined depth (i.e., at or above a predetermined external pressure), but the reduction in latching force may not be sufficient in-and-of itself to enable the locking portions 408 and 410 to separate. Nevertheless, the reduced latching force may enable the lifting bag 302 to more easily separate the cover members 400 and 402, and thus still may provide an operational advantage. Stated otherwise, though a full de-coupling of the cover member 400 from cover member 402 may not occur once the predetermined depth (i.e., predetermined pressure) is met or exceeded, the force needed to dislodge the cover 202 (e.g., the force provided by an expanding lifting bag) is significantly reduced once the cover 202 approaches or exceeds the predetermined depth (i.e., predetermined pressure). Moreover, based on the nature of the locking member 502 extending along the locking length $L_L$ of the cover 202, in most cases when the cover 202 is released, the release is along the entire locking length $L_L$ of the cover 202.

As previously discussed, the cross-sectional shapes of the appendages and corresponding hollows need not be the circular cross-sectional shapes (with slots and standoffs) described in FIGS. 4, 5, and 6. FIG. 7 shows a perspective, cross-sectional view of a portion of a cover 700 held together with a locking member 706 in accordance with other embodiments. In particular, in FIG. 7 the cross-sectional shape of appendages 702 and 704 are triangular. Likewise, the cross-sectional shape of the corresponding hollows 708 and 710 are triangular. As previously discussed, although both circular and triangular cross-sections have been shown, any cross-sectional shapes may be contemplated (e.g., square, oblong).

In addition to varying the cross-sectional shape of the appendages and hollows, other variations of the system are contemplated. For example, in various embodiments, the compressibility of the appendages can be controlled by selecting from a plurality of possible materials having specific durometer readings, specific modulus of elasticity, and varying wall thicknesses and profiles for both the hollows and the appendages. Furthermore, the type and quantity of gas in the appendages, the size and shape of the appendages, the size and shape of the hollows, and the material of the appendages may vary in order to select the desired pressure (i.e., predetermined depth) at which the system releases.

In selecting the material from which the appendages and/or cover members may be constructed, consideration may be given to the contemplated ease of insertion and removal of the appendages into and out of their respective hollows. Thus, in one embodiment, the material selected for the appendages and the material selected for the locking portions of the cover members may be such that the coefficient of kinetic friction is low enough to enable ease of movement between the appendages when telescoping the appendages into and out of the hollows (e.g., installation), while still maintaining a high enough coefficient of friction to keep the appendages located within the hollows until a pressure-activated release occurs. For example, a coefficient of kinetic friction between 0.2 and 0.6 $\mu_k$ may be low enough to facilitate easy movement during installation, while still providing enough static friction to keep the appendages from sliding out of the hollows during use. Additionally, selecting materials which have a lower coefficient of friction may also reduce the amount of wear caused from the insertion of and removal of the appendages into and out of the hollows over time, thus lowering the potential costs.

In other embodiments, the orientation and coupling mechanisms of various elements of the contemplated system may vary, such as in the example embodiment shown in FIG. 8. FIG. 8 shows a perspective, cut-away view of a portion of a cover 800 in accordance with other embodiments. In particular, FIG. 8 shows example cover 800 comprising a first cover member 802 and a second cover member 804. The first cover member 802 defines an internal or inner surface 806, and likewise the second cover member 804 defines an internal or inner surface 808. In example systems, the cover members 802 and 804 may be opposites ends of a single "U" shaped structure, and the portion of the cover 800 between the first and second cover members 802 and 804 may be referred to as spanning cover member 810 (the entire spanning cover member 810 not shown so as to show the coupling in better detail). In accordance with example embodiments the cover 800 may be made of polyurethane with a durometer reading of 85 A, but other materials (e.g., nylon), and other durometer readings, may be equivalently used.

The cover members 802 and 804 define locking portions 812 and 814, respectively. The locking portions define various features which create a releasable coupling between the first cover member 802 and the second cover member 804. In particular, locking portion 812 of FIG. 8 defines a first appendage 816 protruding away from the first cover member 802, and protruding toward the second cover member 804. Similarly, locking portion 804 defines a second appendage 818 protruding away from the cover member 814, and protruding toward the first cover member 802. The appendages 816 and 818 extend along the locking length $L_L$ of the cover 800. In the example system of FIG. 8, the appendage 816 defines a cylindrical member 820 held by a standoff portion 822. Similarly, the appendage 818 defines a cylindrical member 824 held by a standoff portion 826. Thus, the example appendages may define a "key" cross-sectional shape.

Similar to the appendages 504 and 506 of FIG. 5, each appendage 816 and 818 defines a sealed internal volume 830 and 832, respectively, containing a compressible gas having a predetermined pressure. In the cross-sectional view of FIG. 8, the caps or other mechanisms used to seal the appendages are not visible. In some cases, the gas within the sealed internal volumes is atmospheric air at atmospheric pressure, but other gases and pressures (both above and below atmospheric) may be used. Moreover, the material from which the appendages are constructed (again, in some cases polyurethane) has a certain compressibility. The compressibility of the appendages 816 and 818, along with the compressibility of the gas within the appendages, work together to form a releasable connection at the locking portions 812 and 814 (discussed more below).

In the example system of FIG. 8, locking portion 812 further defines a ridge 834, the ridge 834 running parallel to appendage 816 at the base of the standoff portion 822. The apex of the ridge 834 can be considered to define a line, and the line resides below a conceptual tangential plane defined by the cover 800 at the radial position of the ridge 834. Similarly, locking portion 814 further defines a ridge 836, the ridge 836 running parallel to appendage 818 at the base of the standoff portion 826. The apex of the ridge 836 can be considered to define a line, and the line resides below a conceptual tangential plane defined by the cover 800 at the radial position of the ridge 836.

FIG. 8 further shows a locking member 838 disposed between the locking portions 812 and 814. More particularly, the locking member 838 couples to the cover members 802 and 804, and in some cases defines a length being the locking length $L_L$ (FIG. 2). The locking member 838 selectively holds the cover members 802 and 804 together, and thus holds the cover 800 in place over an underlying structure (e.g., a retriever system). In example systems, the locking member 838 is made of polyurethane with a durometer reading of 85

A, but other materials (e.g., nylon), and other durometer readings may be equivalently used.

In the example system of FIG. 8, the locking member 838 defines a trough or hollow 840 that extends along locking length $L_L$ of the locking member 838, where hollow 840 is the "negative" of, or complement of, the appendage 816. In the example system shown, the hollow 840 thus has a circular cross-sectional shape connected to a slot (not visible), and thus could be considered to define the cross-sectional shape of a "keyhole." However, other cross-sectional shapes are also contemplated. The hollow 840 defines a central axis (not shown so as not to unduly complicate the figure) such that, when the cover 800 is installed, the central axis of the hollow 840 is parallel to central axis 206 (FIG. 2) of the sensor streamer 106, and coaxial with the central axis of the cylindrical member 820. Similarly, the locking member 838 defines a second hollow 842 connected to a slot (not visible), where the second hollow 842 is disposed opposite the first hollow 840 on the locking member 838, and where hollow 840 is the "negative" of, or complement of, the appendage 818. The second hollow 842 (and associated slot) in the example system of FIG. 8 could also be considered to define the cross-sectional shape of a "keyhole." The hollow 842 defines a central axis (not shown so as not to unduly complicate the figure) such that, when the cover 800 is installed, the central axis of the hollow 842 is parallel to central axis 206 (FIG. 2) of the sensor streamer 106, parallel to the central axis of hollow 840, and coaxial with the central axis of cylindrical member 824.

The locking member 838 further defines two troughs that, when the locking member is installed, couple to the ridges 834 and 836. In particular, the locking member 838 defines a first trough 850 that couples to and abuts the ridge 834, and the second trough (not visible in the view of FIG. 8) opposite the first trough on the locking member 838, where the second trough couples to and abuts ridge 836. The ridges on the cover 800 and respective troughs on the locking member 838 may help ensure the long edges of the locking member 838 remain in good physical contact with the cover 800 in spite of variance in size (e.g., manufacturing variances), changes in size caused by changes in ambient temperature, and/or change in size cause by changes in ambient pressure.

Installation of the example locking member 838 is similar to the locking member 502 of FIG. 5, and so as not to unduly lengthen the specification, the description is not repeated again. FIG. 8 does show, however, that the puller member may take a variety of forms. In particular, the example puller member 860 of FIG. 8 is a long, thin rectangular structure embedded at least partially within the locking member 838 and extending beyond the locking member so that an installer has a location at which to grasp and pull the locking member 838 into place, as shown by the arrow 862. In some cases, the example puller member 860 may be metallic, but plastic material may also be used. Moreover, the puller member in the form a solid cylindrical member or rope can be used in the example embodiments of FIG. 8, and likewise the puller member 860 in the form of a long, thin rectangular structure can be used with the example embodiments of FIG. 5.

Similar to the embodiments of FIG. 5, as the appendages 816 and 818 collapse, the locking force provided is diminished. At or below the predetermined depth (i.e., above the predetermined pressure), sufficient latching force is lost such that the first cover member 802 may separate from the second cover member 804. In some cases, the cover members 802 and 804 are opposite ends of a single, integral "U" shaped structure such that, during installation, a spring force is created by torqueing the cover members 802 and 804 toward each other. Thus, when the spring force created by the cover members 802 and 804 overcomes the latching force created by the appendages 816 and 818 within the respective hollows 840 and 842, the cover members 802 and 804 may separate and the cover 800 may open. In other cases, the latching force provided by the appendages 816 and 818 within the hollows may reduce as the cover 800 meets or exceeds a predetermined depth, but the reduction in latching force may not be sufficient in-and-of itself to enable separation. Nevertheless, the reduced latching force may enable the lifting bag 302 to more easily separate the cover members 802 and 804, and thus still may provide an operational advantage.

Figure 9:
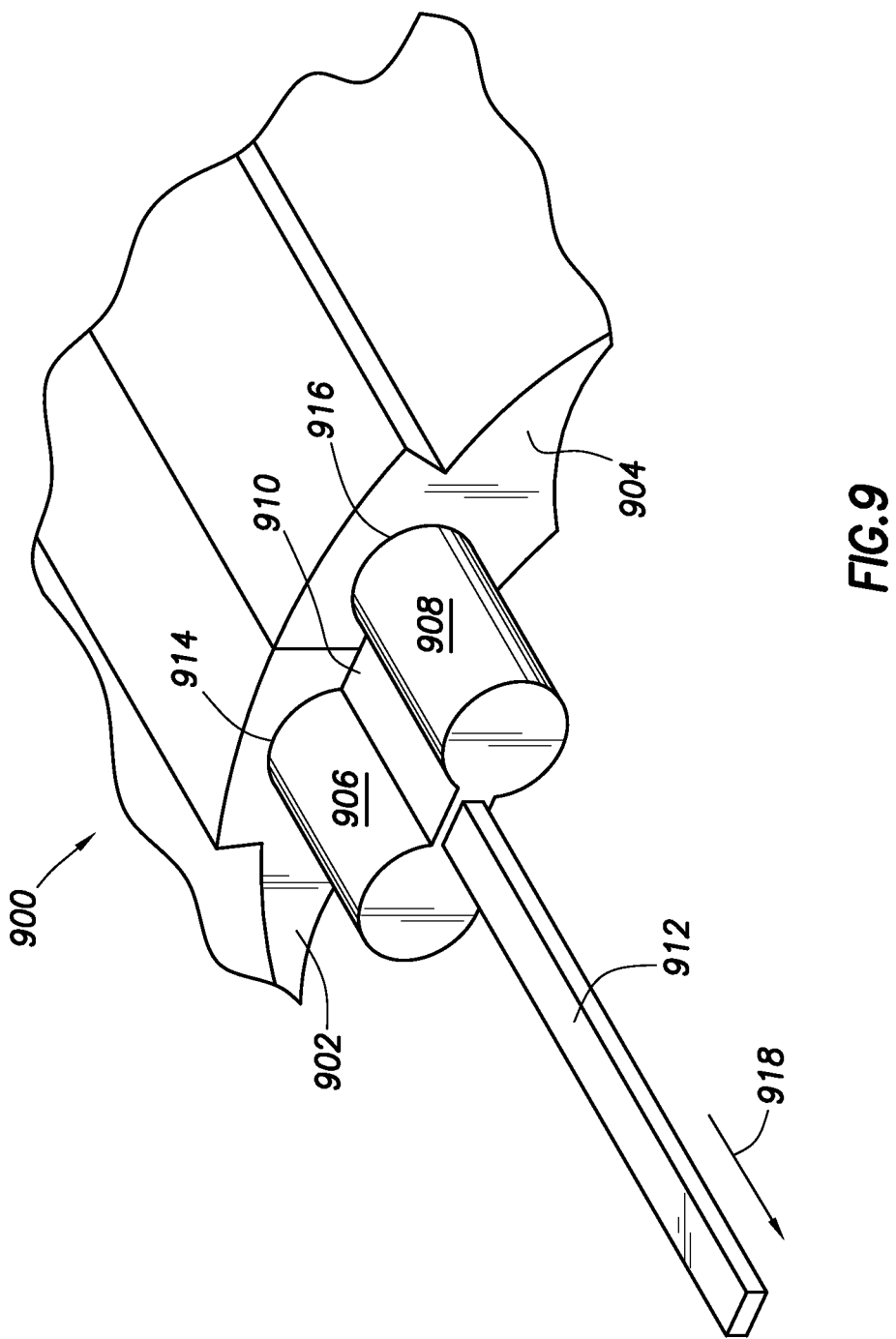
FIG. 9 shows a perspective, cross-sectional, view of a portion of an releasable cover held in accordance with at least some embodiments.

FIG. 9 shows a perspective, cross-sectional, view of a portion of an cover in accordance with another example embodiment. In particular, FIG. 9 shows a configuration in which the inner surfaces of locking portions 902 and 904 directly abut one another while in a coupled configuration.

In the example system of FIG. 9, locking portion 902 defines a hollow 914. In the example system shown, the hollow 914 has a circular cross-sectional shape, but as previously discussed other cross-sectional shapes are also contemplated. The hollow 914 defines a central axis such that, when a locking member 910 is installed, the central axis of the hollow 914 is parallel to the central axis 206 (as shown in FIG. 2) of the sensor streamer 106. Similarly, the second locking portion 904, defines a hollow 916. The hollow 916 in the example system has a circular cross-sectional shape, but other cross-sectional shapes are also contemplated, and the cross-sectional shapes as between the hollow 914 and the hollow 916 need not be the same. The hollow 916 defines a central axis such that, when the locking member 910 is installed, the central axis of the hollow 916 is parallel to the central axis 206 (FIG. 2) of the sensor streamer 106, and likewise parallel to the central axis of hollow 914.

Locking portions 902 and 904 are held in a coupled position by a locking member 910. Locking member 910 defines a first appendage 906 on a first side of the locking member, and also defines a second appendage 908 disposed opposite the first appendage 906. As shown, first appendage 906 defines an exterior cross-sectional shape that is the "negative" of, or complement, of the cross-sectional shape of the hollow 914. Similarly, the second appendage 908 defines a circular exterior cross-sectional shape that is the "negative" of, or complement of, the circular cross-sectional shape of hollow 916.

When in the coupled configuration, and as shown in FIG. 9, the first appendage 906 is disposed within the first hollow 914, and the second appendage 908 is disposed within the second hollow 916. In this embodiment, and above the predetermined depth, the locking member 910 holds the locking portions 902 and 904 in an abutting orientation. In one example embodiment, the locking member 910 is installed by telescoping the appendages 906 and 908 into the hollows 914 and 916, respectively. In some cases, the locking member 910 may have a puller member 912 (illustratively shown as the long, thin metallic strip) embedded partially within the locking member 910 and extending beyond the locking member so that an installer has a location at which to grasp and pull the locking member 910 into place, as shown by the arrow 918. The other embodiments of the puller member may be used in the embodiments of FIG. 9 as well.

In accordance with the example system shown in FIG. 9, and as previously described in accordance with the other example embodiments, each appendage 906 and 908 defines a sealed internal volume containing a compressible gas having a predetermined pressure. In some cases, the gas is atmospheric air at atmospheric pressure, but other gases and pressures (both above and below atmospheric) may be equivalently used. Moreover, the material from which the appendages are constructed (again, in some cases polyurethane) have a certain compressibility. The compressibility of the appendages 906 and 908, along with the compressibility of the gas within the appendages, work together to form a releasable connection of locking portions 902 and 904 against one another. Operation of the example system of FIG. 9 is similar to that previously described, and will not be repeated again here so as not to unduly lengthen the specification.

In the various embodiments discussed to this point, the discussion has implicitly assumed that that the sealed internal volumes of the appendages are pre-pressurized prior to installation of the cover over a device. Pressurization may take many forms, both before installation and after. In particular, FIG. 10 shows a schematic, partial cross-sectional diagram of a system in which an appendage, and thus the sealed internal volume associated with each appendage, has associated therewith a valve that enables filling and/or changing the pressure within the sealed internal volume. In particular, FIG. 10 shows a cross-sectional view of an appendage 1000 (illustrative of any of the foregoing appendages) defining a sealed internal volume 1002. In the example of FIG. 10, one end may be sealed by a cap 1004 (illustrative of caps 550 and 552). Disposed within, or otherwise associated with, the cap 1004 is a valve 1006 (shown in schematic form). The valve 1006 is coupled to a piping 1008 (also shown in schematic form), and thus fluidic communication between the piping 1008 and the sealed internal volume 1002 may be controlled by valve 1006.

In accordance with embodiments shown in FIG. 10, the pressure of gas inside the sealed internal volume 1002 may be controlled or adjusted by way of valve 1006. That is, to increase pressure, a pressure source may be coupled to piping 1008 and valve 1006 opened. Similarly, to decrease pressure the valve 1006 may be opened, enabling gas to escape the sealed internal volume, or to be pumped out of the sealed internal volume 1002. In some cases, the valve 1006 may be a check valve (e.g., a microcheck valve) which would enable gas flow into the sealed internal volume 1002, but not flow out of the sealed internal volume 1002.

Finally, the various embodiments discussed to this point have assumed sealed internal volumes containing a gas; however, in yet still other embodiments the internal volumes may contain a compressible substance or material. For example, FIG. 11 shows a cross-sectional view of an appendage, and thus the internal volume associated with the appendage, having a material of a closed-cell structure (e.g., closed-cell foam) disposed therein. In particular, FIG. 11 shows a cross-sectional view of an appendage 1100 (illustrative of any of the foregoing appendages) defining an internal volume 1102. In the example of FIG. 11, one end may be sealed by a cap 1104 (illustrative of caps 550 and 552). Disposed within the internal volume is the material of a closed-cell structure 1106 (e.g., a closed-cell foam, closed-cell neoprene foam). The gas capture within each "cell" of the closed-cell foam is compressible, and thus the closed-cell foam itself is compressible. As the appendage experiences increasing ambient pressure, the increasing ambient pressure collapses the outer portions of the appendage and compresses the material of a closed-cell structure 1106. The material of a closed-cell structure 1106 within the internal volume 1102 gives increased structural rigidity to the appendage, and thus may be used for deeper predetermined depths; whereas, relatively shallow predetermined depths may have only atmospheric air at atmosphere pressure, or below.

The material of a closed-cell structure 1106 may be placed within the internal volume 1102 in several ways. In one case, the foam is poured or injected in liquid form, and allowed to expand and/or solidify within the internal volume. In other cases, the material of a closed-cell structure 1106 may be an insert that is telescoped within the internal volume. In many cases, in spite of using a material of a closed-cell structure the internal volume will still be a sealed internal volume to reduce water intrusion and marine growth within the spaces of the internal volume not occupied by the material of a closed-cell structure; however, in other cases the internal volume can remain exposed to the water.

In reference to FIG. 12, a method of placing a releasable cover around an object will now be discussed in more detail. The method starts (block 1200) with placing a releasable cover around an object (block 1202), by wrapping the object with the releasable cover, the wrapping aligns a first locking portion of the releasable cover with a second locking portion of the releasable cover (block 1204); and sliding a locking member between the first locking portion and the second locking portion, the sliding engages a first appendage of the locking member into a first hollow defined on the first locking portion, and the sliding engages a second appendage of the locking member into a second hollow defined on the first locking portion (block 1206). Thereafter, the method ends (block 1208).

Figure 13:
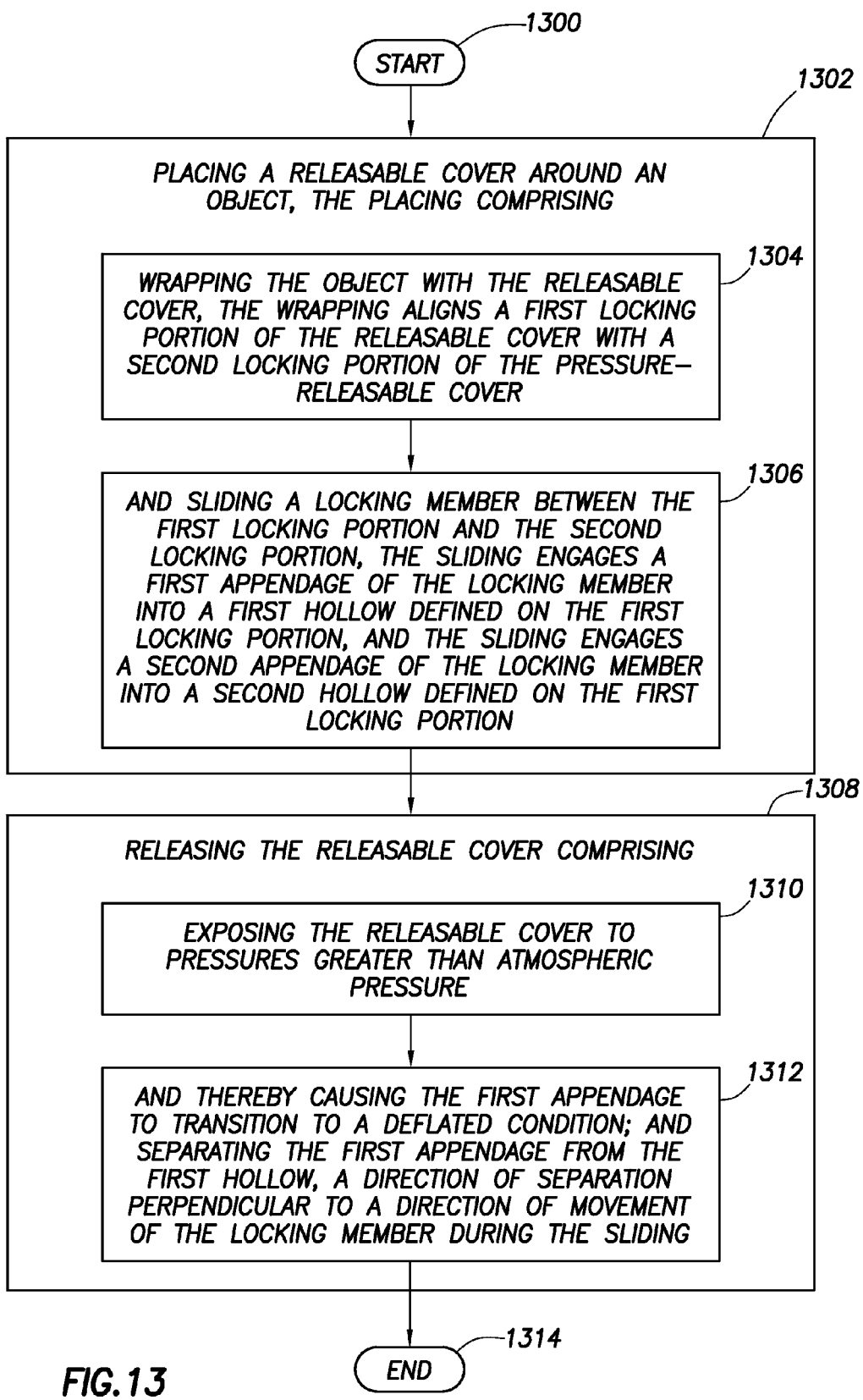
FIG. 13 shows, in block diagram form, a method in accordance with at least some embodiments.

In reference to FIG. 13, another method of placing and releasing a releasable cover around an object will now be discussed in more detail. The method starts (block 1300) by placing a releasable cover around an object (block 1302), the placing comprising wrapping the object with the releasable cover, the wrapping aligns a first locking portion of the releasable cover with a second locking portion of the releasable cover (block 1304); and sliding a locking member between the first locking portion and the second locking portion, the sliding engages a first appendage of the locking member into a first hollow defined on the first locking portion, and the sliding engages a second appendage of the locking member into a second hollow defined on the first locking portion (block 1306); releasing the pressure releasable cover comprising exposing the releasable cover to pressures greater than atmospheric pressure (block 1308); and thereby causing the first appendage to transition to a deflated condition (block 1310); and separating the first appendage from the first hollow, a direction of separation perpendicular to a direction of movement of the locking member during the sliding (block 1312). Thereafter, the method ends (block 1314).

References to "one embodiment", "an embodiment", "a particular embodiment", "an example embodiment" and "some embodiments" indicate that a particular element or characteristic is included in at least one embodiment of the invention. Although the phrases "one embodiment", "an embodiment", "a particular embodiment", "an example embodiment" and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, in order to better control the pressure at which the cover is released, the appendages may be coated with the lubricant. It is intended that the following claims be interpreted to embrace all such variations and modifications.

We claim:

1. A releasable cover comprising:
   a first cover member that defines an inner surface, an outer surface, a length, and a first locking portion extending along the length of the first cover member;
   a first hollow defined in the locking portion of the first cover member, the first hollow extending along the length of the first cover member;
   a second cover member that defines an inner surface, an outer surface, a length, and a second locking portion extending along the length of the second cover member;
   a second hollow defined in the second locking portion of the second cover member, the second locking portion extending along the length of the second cover member;
   a locking member that defines a first appendage extending along a first side, and a second appendage extending along a second side opposite the first side, each appendage defines a cross-sectional shape, and each appendage defines an internal volume;
   said first appendage disposed within the first hollow, and when the releasable cover is exposed to an initial pressure, the first appendage in an inflated condition;
   said second appendage disposed within the second hollow, and when the releasable cover is exposed to the initial pressure, the second appendage in an inflated condition; and
   wherein the first and second appendages are configured to transition to a deflated condition in response to a predetermined pressure greater than the initial pressure.

2. The releasable cover of claim 1 wherein when the releasable cover is exposed to the initial pressure being atmospheric pressure, the first appendage in an inflated condition.

3. The releasable cover of claim 1 wherein the predetermined pressure is about fifty times atmospheric pressure.

4. The releasable cover of claim 1 wherein the first and second appendages are further configured to respond to the deflated condition by decoupling from their respective hollows.

5. The releasable cover of claim 1 wherein the first locking portion abuts the second locking portion.

6. The releasable cover of claim 1 wherein first cover member and second cover member are disposed on opposite ends of a spanning cover member.

7. The releasable cover of claim 1 wherein each appendage defines a sealed internal volume.

8. The releasable cover of claim 7 wherein when the releasable cover is exposed to the initial pressure, a first pressure within the sealed internal volume of the first appendage holds the first appendage in the inflated condition, and a second pressure within the sealed internal volume of the second appendage holds the second appendage in the inflated condition.

9. The releasable cover of claim 7 wherein
   the first appendage further comprises a first valve fluidically coupled to the sealed internal volume of the first appendage; and
   the second appendage further comprises a second valve fluidically coupled to the sealed internal volume of the second appendage.

10. The releasable cover of claim 1 further comprising material of a closed-cell structure foam disposed within at least one of the sealed internal volumes of the first appendage and second appendages.

11. The releasable cover of claim 1 disposed around portions of a retriever system of a sensor streamer for a marine geophysical survey.

12. The releasable cover of the claim 1 wherein the cross-sectional shapes of the appendages is at least one selected from the group consisting of: circular; and triangular.

13. The releasable cover of claim 1 wherein the cross-sectional shapes of the hollows are a negative image of the cross-sectional shape of the respective appendages.

14. The releasable cover of claim 1 wherein the appendages are made of at least one selected from the group consisting of: polyurethane; and nylon.

15. The releasable cover of claim 1 further comprising a puller member disposed within and along a length of the locking member parallel to the first appendage, and the puller member exposed on at least one end of the locking member.

16. A releasable cover comprising:
   a first cover member that defines an inner surface, an outer surface, a length, and a first locking portion extending along the length;
   a first appendage defined by the first locking portion and extending along the length, the first appendage defines a cross-sectional shape and an internal volume;
   a second cover member that defines an inner surface, an outer surface, a length, and a second locking portion extending along the length of the second cover member;
   a second appendage defined by the second locking portion and extending along the length of the second cover member, the second appendage defines a cross-sectional shape and an internal volume;
   a locking member that defines a first hollow on a first side, a second hollow on a second side opposite the first side, and a length, each hollow defines a cross-sectional shape and each hollow extends along the length of the locking member;
   said first appendage disposed within the first hollow, and when the releasable cover is exposed to an initial pressure, the first appendage in an inflated condition; and
   said second appendage disposed within the second hollow, and when the releasable cover is exposed to the initial pressure, the second appendage is in an inflated condition;
   wherein the first and second appendages are configured to transition to a deflated condition in response to a predetermined pressure greater than the initial pressure.

17. The releasable cover of claim 16 wherein when the releasable cover is exposed to the initial pressure being atmospheric pressure, the first appendage in an inflated condition.

18. The releasable cover of claim 16 wherein first cover member and second cover member are disposed on opposite ends of a spanning cover member.

19. The releasable cover of claim 16 disposed around portions of a retriever system of a sensor streamer for a marine geophysical survey.

20. The releasable cover of claim 16:
   wherein the internal volume of first appendage is a sealed internal volume; and
   wherein the internal volume of the second appendage is a sealed internal volume.

21. The releasable cover of claim 20 wherein when the releasable cover is exposed to the initial pressure, a first pressure within the sealed internal volume of the first appendage holds the first appendage in the inflated condition, and a second pressure within the sealed internal volume of the second appendage holds the second appendage in the inflated condition.

22. The releasable cover of claim 20:
   wherein the first appendage further comprises a first valve, wherein manipulation of the first valve changes the volume of gas within the first appendage; and wherein the second appendage further comprises a second valve, wherein manipulation of the second valve changes the volume of gas within the second appendage.

23. The releasable cover of claim 16 further comprising material of a closed-cell structure disposed within at least one of the internal volumes of the first and second appendages.

24. The releasable cover of the claim 16 wherein the cross-sectional shapes of the appendages is at least one selected from the group consisting of: circular; and triangular.

25. The releasable cover of claim 16 wherein the cross-sectional shapes of the hollows are a negative image of the cross-sectional shape of their respective appendages.

26. The releasable cover of claim 16 wherein the appendages are made of at least one selected from the group consisting of: polyurethane and nylon.

27. The releasable cover of claim 16 further comprising a puller member disposed within and along the length of the locking member, the puller member parallel to the first hollow, and the puller member exposed on at least one end of the locking member.

28. A method comprising:
   placing a releasable cover around an object, the placing comprising
      wrapping the object with the releasable cover, the wrapping aligns a first locking portion of the releasable cover with a second locking portion of the releasable cover; and
      sliding a locking member between the first locking portion and the second locking portion, the sliding engages a first appendage of the locking member into a first hollow defined on the first locking portion, and the sliding engages a second appendage of the locking member into a second hollow defined on the second locking portion.

29. The method of claim 28 further comprising:
   releasing the releasable cover comprising
      exposing the releasable cover to pressures greater than atmospheric pressure; and thereby
      causing the first appendage to transition to a deflated condition; and
      separating the first appendage from the first hollow, a direction of separation perpendicular to a direction of movement of the locking member during the sliding.

30. The method of claim 29 wherein the releasing the cover further comprises:
   causing the second appendage to transition to a deflated condition; and
   separating the second appendage from the second hollow, a direction of separation perpendicular to a direction of movement of the locking member during the sliding.

31. The method of claim 28:
   wherein wrapping the object further comprises wrapping portions of a retriever system of a sensor streamer for a marine geophysical survey; and
   wherein exposing the releasable cover further comprises submerging the releasable cover below a predetermined depth.

32. A method comprising:
   placing a releasable cover around an object, the placing comprising
      wrapping the object with the releasable cover, the wrapping aligns a first locking portion of the releasable cover with a second locking portion of the releasable cover; and
      sliding a locking member between the first locking portion and the second locking portion, the sliding engages a first hollow of the locking member onto a first appendage defined by the first locking portion, and the sliding engages a second hollow of the locking member onto a second appendage defined by the second locking portion.

33. The method of claim 32 further comprising:
   releasing the releasable cover by
      exposing the releasable cover to pressures greater than atmospheric pressure; and thereby
      causing the first appendage to transition to a deflated condition; and
      separating the first appendage from the first hollow, a direction of separation perpendicular to a direction of movement of the locking member during the sliding.

34. The method of claim 33 wherein the releasing the cover further comprises:
   causing the second appendage to transition to a deflated condition; and
   separating the second appendage from the second hollow, a direction of separation perpendicular to a direction of movement of the locking member during the sliding.

35. The method of claim 32:
   wherein wrapping the object further comprises wrapping a retriever system of marine geophysical survey streamer; and
   wherein exposing the releasable cover further comprises submerging the releasable cover below a predetermined depth.

* * * * *